United States Patent [19]

Messerly

[11] Patent Number: 5,941,944

[45] Date of Patent: Aug. 24, 1999

[54] METHOD FOR PROVIDING A SUBSTITUTE FOR A REQUESTED INACCESSIBLE OBJECT BY IDENTIFYING SUBSTANTIALLY SIMILAR OBJECTS USING WEIGHTS CORRESPONDING TO OBJECT FEATURES

[75] Inventor: John J. Messerly, Bainbridge Island, Wash.

[73] Assignee: Microsoft Corporation, Redmond, Wash.

[21] Appl. No.: 08/828,813

[22] Filed: Mar. 3, 1997

[51] Int. Cl.[6] .............................. G06F 15/16; G06F 17/30
[52] U.S. Cl. .............................. 709/203; 709/219; 707/3; 707/5
[58] Field of Search .............................. 707/3–5, 10, 104, 707/501, 513; 709/200, 203, 217–219

[56] References Cited

U.S. PATENT DOCUMENTS

| | | | |
|---|---|---|---|
| 5,297,042 | 3/1994 | Morita | 707/5 |
| 5,446,891 | 8/1995 | Kaplan et al. | 707/2 |
| 5,675,710 | 10/1997 | Lewis | 706/12 |
| 5,694,593 | 12/1997 | Baclawski | 707/5 |
| 5,694,594 | 12/1997 | Chang | 707/6 |
| 5,713,016 | 1/1998 | Hill | 707/5 |
| 5,724,567 | 3/1998 | Rose et al. | 395/602 |
| 5,727,129 | 3/1998 | Barrett et al. | 706/10 |
| 5,745,360 | 4/1998 | Leone et al. | 707/513 |
| 5,749,081 | 5/1998 | Whiteis | 707/102 |
| 5,751,956 | 5/1998 | Kirsch | 395/200.33 |
| 5,765,150 | 6/1998 | Burrows | 707/5 |
| 5,774,660 | 6/1998 | Brendel et al. | 709/201 |
| 5,778,362 | 7/1998 | Deerwester | 707/5 |
| 5,794,257 | 8/1998 | Liu et al. | 707/501 |
| 5,805,824 | 9/1998 | Kappe | 709/242 |
| 5,822,539 | 10/1998 | Van Hoff | 709/236 |
| 5,855,015 | 12/1998 | Shoham | 707/5 |
| 5,870,552 | 2/1999 | Dozier et al. | 707/501 |

OTHER PUBLICATIONS

Pitkow, J., et al., "Towards an Intelligent Publishing Environment," Computer Networks and ISDN Systems, vol. 27, No. 6, pp. 729–737, Apr. 1995.

Kappe, F., "Maintaining Link Consistency in Distribute Hyperwebs," http://info.isoc.org/HMP/PAPER/073/html/paper.html, pp. 1–17, Apr. 1995.

Creech, M., "Author Oriented Link Management," Computer Networks and ISDN Systems, vol. 28, No. 11, pp. 1015–1025, May 1996.

Pitkow, J., et al., "Supporting the Web: A Distributed Hyperlink Database System," Computer Networks and ISDN Systems, vol. 28, No. 11, pp. 981–991, May. 1996.

Ingham, D., et al., "Fixing the Broken Link Problem: the W3Objects Approach," Computer Networks and ISDN Systems, vol. 28, No. 11, pp. 1255–1268, May 1996.

Carr, L., et al., "Open Information Services," Computer Networks and ISDN Systems, vol. 28, No. 11, pp. 1027–1036, May 1996.

Derfler, F., "How Networks Work," Ziff–Davis Press, pp. 80–85, 1996.

Gralla, P., "How the Internet Works," Ziff–Davis Press, pp. 229–235, Jun. 1996.

U.S. ser. No. 08/732, 615, DeBonet, filed Oct. 16, 1996.

(List continued on next page.)

*Primary Examiner*—Zarni Maung
*Assistant Examiner*—Andrew Caldwell
*Attorney, Agent, or Firm*—Michaelson & Wallace; Peter L. Michaelson

[57] ABSTRACT

Weights are assigned to features of data objects and the weights are utilized to determine whether data objects are substantially identical or not. One application of such weights is to assign weights to terms in web page documents. The weights assigned to the terms may then be utilized to determine whether web page documents are substantially identical. A set of identicals may be generated for each web page that is indexed by the system and utilized to repair broken hyperlinks. Specifically, when a uniform resource locator (URL) associated with the hyperlink cannot be resolved or cannot be resolved in a timely fashion, one of the identicals of the desired web page documents may be returned to provide a requesting party with the desired content.

47 Claims, 13 Drawing Sheets

OTHER PUBLICATIONS

G. Salton, "Developments in Automatic Text Retrieval", *Science,* vol. 253, Aug. 30, 1991, pp. 974–980.

H. Turtle et al., "Inference Networks for Document Retrieval", *Proceedings of the Thirteenth International Conference on Research and Development in Information Retrieval* (© 1990, Assoc. for Computing Machinery), pp. 287–298.

D. Harman et al., "Retrieving Records from a Gigabyte of Text on a Minicomputer Using Statistical Ranking", *Journal of the American Society of Information Science,* vol. 41(8), Dec. 1990, pp. 581–589.

G. Salton et al., "Term–Weighting Approaches in Automatic Text Retrieval" *Information Processing and Management,* vol. 24, No. 5, 1988, pp. 513–523.

METHOD FOR PROVIDING A SUBSTITUTE FOR A REQUESTED INACCESSIBLE OBJECT BY IDENTIFYING SUBSTANTIALLY SIMILAR OBJECTS USING WEIGHTS CORRESPONDING TO OBJECT FEATURES

TECHNICAL FIELD

The present invention relates generally to data processing systems, and more particularly, to the identification of substantially identical data objects by comparing scoring of features.

BACKGROUND OF THE INVENTION

Internet usage has increased dramatically in the past few years and as a result, the usage of hypertext documents that contain hypermedia links has also increased dramatically. Hypermedia links provide an address path to access media content that is related to or associated with text, graphics, video or audio. Typically, a user utilizes a hypermedia link by selecting the link with a mouse. Specifically, the user positions a mouse cursor over the link (which is highlighted or displayed in a color that indicates that it is a link) and clicks the mouse to retrieve media content accessible through the link. Upon the user selection of the link, a web browser program accesses the address path of the media content that is encoded in the link, retrieves the media content and renders the media content to the user. For most wet pages, this entails displaying video information on a video display for a web page. Nevertheless, audio information may also be retrieved and output.

FIG. 1A is a block diagram that illustrates the basic scheme that is employed in retrieving such media content with a conventional web browser 10. The web browser 10 is run on a client computer system 12. The web browser 10 is used to generate a request 14 for the media content from a server computer system 16. Typically, this request 14 is a GET request that complies with the hypertext transfer protocol (HTTP). The server computer 16 receives the request 14, accesses the media content 18 stored therein and returns a copy of the media content 20 to the client computer system 12. The web browser 10 includes code for rendering the media content 20 so that the content is output to the user. Typically, for a web page, the copy of the media content 20 is forwarded as a hypertext markup language (HTML) document. The HTML document may contain a number of hyperlinks that enable the user to gain access to other web sites.

One difficulty encountered with hypertext documents is that the hypermedia links embedded within the documents may be unresolvable (i.e., not resolved to a web set). One of the causes for such unresolvable links is that the storage location of the media 18 may be changed without updating the links contained within the Hypertext document. In such cases, the web browser 10 returns an error message because the media content is no longer located at the address path specified by the link. As a result, the user is unable to access the media content associated with the link.

Similar difficulties may be encountered in different environments. Other references to objects or files may also be subject to change that makes them unresolvable. For example, links and path names that refer to other files or objects may change. These references may also be, for example, object identifiers (object IDs) or other types of signatures that uniquely identify a file or object holding text or other media, such as audio data or video data. FIG. 1B shows the case where an operating system (OS) or network operating system (NOS) 11 at a client 12 seeks access to a resource 13 stored on a server 16. The server 16 may be connected to the client 12 via a local area network (LAN) or wide area network (WAN). The OS/NOS 11 may use an object identifier, path name or other resource identifier to access the resource 13. Unfortunately, such an object identifier, path name or resource identifier may not be current. As a result, access to the resource may not be possible.

SUMMARY OF THE INVENTION

In accordance with a first aspect of the present invention, weights for features of a first data object and a second data object are provided. These weights may, for example, be provided for terms of a web page document. Each weight specifies a measure of how greatly the feature distinguishes the data object within a collection of data objects. A first weight for a feature in the first data object is compared with a second weight for the same feature in the second data object to determine whether the first data object and the second data object are substantially identical. Where the first weight and second weight are substantially similar, it may be determined that the first object and the second object are substantially identical. Similarly, where the first weight and the second weight are not substantially similar, it may, in some instances, be determined that the first object and the second object are not substantially identical. Additional weights for additional terms may be compared to more conclusively determine whether the first data object and the second data object are substantially identical.

In accordance with another aspect of the present invention, a hypertext document is provided that has a hyperlink to a selected web site that holds media content. A party selects the hyperlink and in response, an attempt is made to access the selected web site. When the attempt to access the selected web site is not successful, another web site is identified that holds substantially identical media content as the selected web site. The web site that holds the substantially identical media content is accessed, and the media content held therein is returned to the requesting party.

In accordance with a further aspect of the present invention, a word weight is calculated for a term within a first document, and a second word weight is calculated for the same term within a second document. For each document, the word weight is calculated by first calculating a collection frequency component that identifies how often the term appears within documents that are part of collection documents. For each of the documents, a term frequency component is calculated to be equal to how many times the term appears within the respective document. The word weight is determined by calculating a product of the collection frequency component and the term frequency component for the respective documents and normalizing the product. The word weight for the term in the first document is compared with the word weight for the term in the second document and is utilized to determine whether the documents are substantially identical. Where the word weight for the term in the first document and the word weight for the term in the second document are substantially identical, it may, in some instances, be concluded that the first document and the second document are substantially identical.

It should be appreciated that the present invention may also be applied to finding and accessing resources in a LAN or WAN. The resources may be, for example, stored on a server that a client wishes to access. The techniques of the present invention that are applied to hyperlinks are equally applicable to object identifiers, path names and other resource identifiers. The present invention is not limited to accessing objects in an object-oriented environment; rather it may be applied more generally to a broader category of resources, such as files, printers and machines, that have associated information for accessing the resources.

BRIEF DESCRIPTION OF THE DRAWINGS

An exemplary embodiment of the present invention will be described below relative to the following figures.

DETAILED DESCRIPTION OF THE INVENTION

Figure 1A:
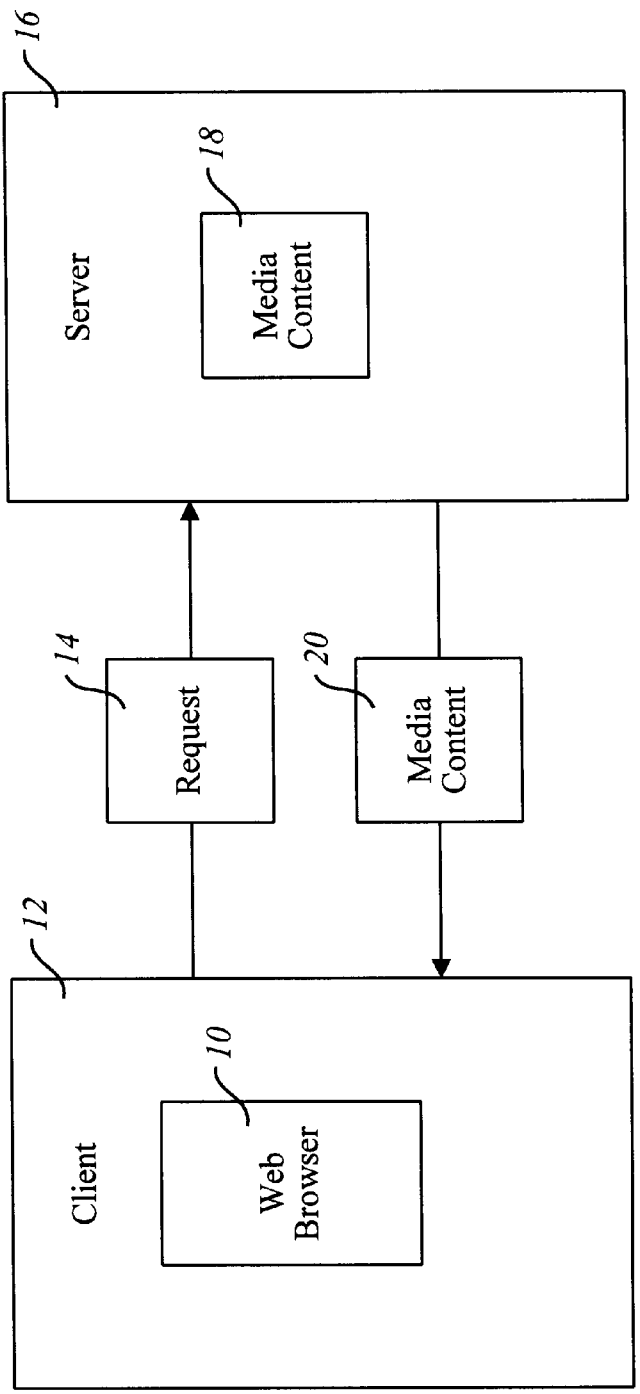
FIG. 1A is a block diagram of a conventional system that is used to access media content on the Internet.
Figure 1B:
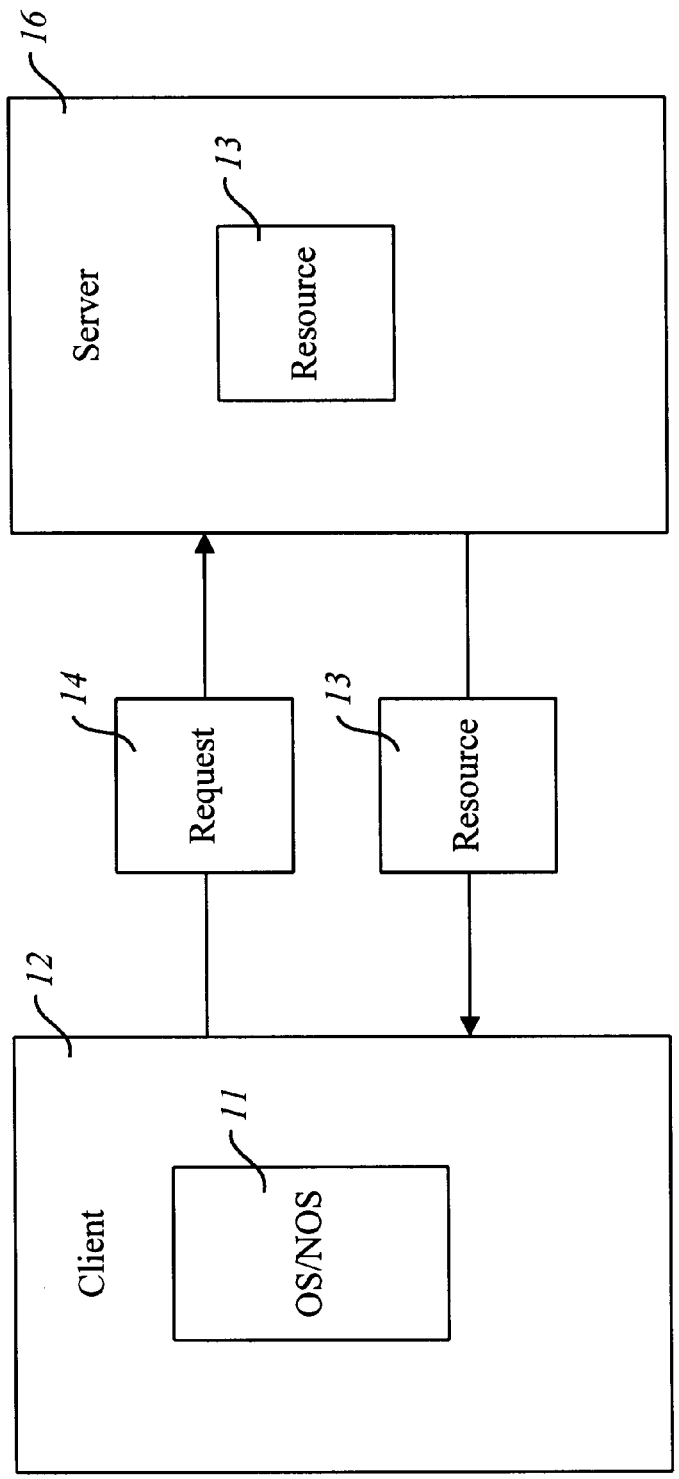
FIG. 1B is a block diagram of a conventional system wherein a client seeks access to a resource on a server.

The exemplary embodiment of the present invention described below provides an approach to comparing data objects to quickly and easily determine whether the data objects are substantially identical. This approach compares the weighting of features of the data objects to determine whether the data objects are substantially identical. Features having the most distinguishing characteristic (as reflected in the weights) are compared first so as to minimize the required number of comparisons of features and to quickly be able to determine whether data objects are substantially identical or not. As will be described in more detail below, the weighting of the features of the data objects is such that it is highly unlikely that two documents that are not substantially identical will have similar weights for the most distinguishing features within the data objects. Thus, substantially identical data objects may be identified with a high degree of certainty without requiring large computational overhead.

The approach to identifying substantially identical data objects adopted by the preferred embodiment of the present invention may be applied to help resolve broken links in hypertext documents. In particular, the approach may be employed to identify media content that is substantially identical to the media content addressed by the broken link. When the broken link is detected, one of the substantially identical objects that holds media content is returned rather than displaying an error message. The exemplary embodiment of the present invention described herein builds a database containing sets of substantially identical data objects, such as web pages. When the broken link is detected, the system accesses the database to locate a substantially identical data object to return to the user. This repairing of broken links may be performed transparently relative to the user and does not require user input.

The present invention may also be applied to resolve and repair other references to objects, files and network resources that are not hyperlinks. For example, Microsoft® OLE links make reference to documents or objects embedded in other files. These files or objects may have moved from one machine to another in a distributed environment. As such, the references associated with links may change. The present invention may be applied to identify a proper reference to repair the broken link. Similarly, the same strategy may be applied to other references to files or objects, including path names and object identifiers, such as CORBA or OLE object IDs ("OIDs"). Thus, the present invention is not limited in scope to objects that are identified by URLs and an Internet or intranet environment. Instead, the present invention applies more broadly to different types of data objects that have various reference mechanisms. These data objects may include network resources located on a local or wide area network.

It should also be appreciated that the present invention may be applied to objects and files that hold non-textual features. For example, the present invention may be applied to files or objects that hold images and/or audio data. Component features of image files may be tokenized and serve as a signature for uniquely identifying the image files. Each such signature may be utilized to identify substantially identical image files and, thus, may be used to help resolve broken references to an image file. A suitable strategy for identifying component features of image files is described in copending application entitled "An Image Classification and Retrieval System Using a Query-By-Example Paradigm," application Ser. No. 08/732,615, which was filed on Oct. 16, 1996 and is copending with the present application. Tokenizers are available for audio files to digitize spoken language into phonemes that uniquely identify the content of the audio files. Such tokenized audio data may be utilized to uniquely identify an audio file and help repair a broken reference to an audio file by adopting an approach like that described in more detail below.

For purposes of the discussion below, the exemplary embodiment will be described relative to an implementation that identifies substantially identical web pages. These web pages include text and it is the terms within the text that serve as the features that are compared to identify substantially identical web pages. Each term in a web page document is assigned a weight that identifies the distinguishing weight of the term relative to other documents. Those skilled in the art will appreciate that the present invention may more generally be applied to the comparison of features within data objects. For example, files containing only graphical content may be compared on a block-by-block basis to determine whether the files are substantially identical or not.

It should also be noted that the present invention will be described below relative to an implementation on the Internet, but those skilled in the art will appreciate that the present invention may be practiced generally in a distributed environment and may be practiced on intranets. Furthermore, a single database need not be maintained for the entire distributed environment; rather the distributed environment may be partitioned into domains or other partitions such that a separate database is maintained for each partition.

Figure 2:
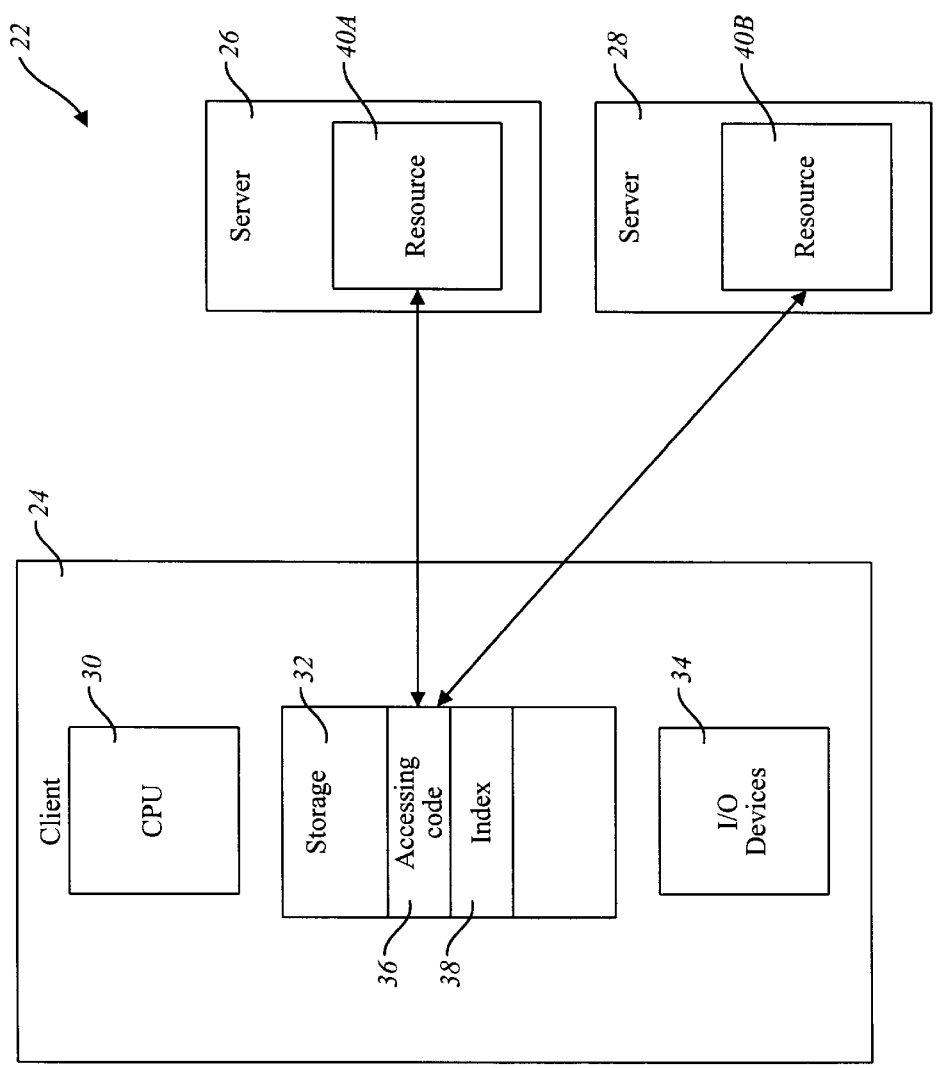
FIG. 2 is a block diagram depicting a computing environment that is suitable for practicing the exemplary embodiment to the present invention.

FIG. 2 is a block diagram that illustrates an example of a computing environment 22 that is suitable for practicing the exemplary embodiment of the present invention. The computing environment 22 includes a client computer system 24 that may communicate with servers 26 and 28 via a network connection. The connection may be realized via modem or a network adapter. For illustrative purposes in the discussion below, it is assumed that the connection is an Internet connection and that servers 26 and 28 reside on the Internet. The client computer 24 includes a central processing unit (CPU) 30, such as a microprocessor. The CPU is accessed to a storage 32 and input/output (I/O) devices 34. The I/O devices 34 may include but are not limited to a keyboard, a mouse, a video display, a modem, and audio loudspeakers. The storage 32 may include both primary storage and secondary storage. Accessing code 36, such as a web browser, is held within a storage 32 and run on the CPU 30. For purposes of the discussion, it is assumed that the accessing code is a web browser. Nevertheless, those skilled in the art will appreciate that the accessing code 36, more generally may be any code, such as an operating system or network operating system, that is used to gain access to a resource. The accessing code is used to gain access to resources 40A and 40B. For purposes of the discussion below, it is assumed that these resources are media content. A database, denoted as an "index" 38, is also stored on the storage 32. As will be described in more detail below, the index 38 contains information regarding what web pages are substantially identical to each other.

Figure 3:
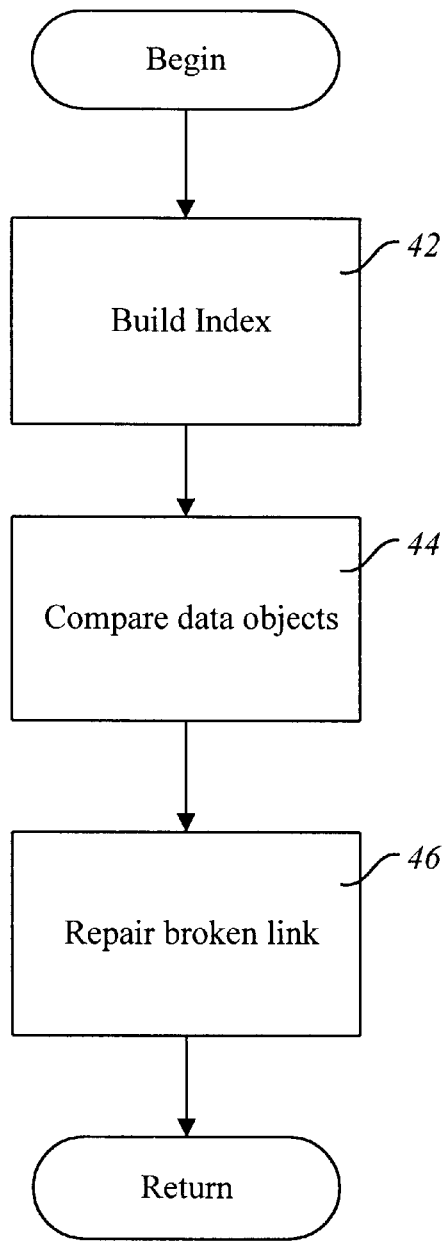
FIG. 3 is a flowchart that provides an overview of the steps performed by the exemplary embodiment of the present invention.

FIG. 3 is a flowchart that provides an overview of the sequential steps that are performed by the exemplary embodiment of the present invention. First, in step 42, the exemplary embodiment of the present invention builds the index 38. The index 38 holds information regarding what words occur within each document and where the words occur within the document. Information regarding what documents are substantially identical to a selected document is stored within the index as well. The information regarding substantially identical documents is added to the index after the completion of step 44 in FIG. 3, where data objects (i.e., web page documents) are compared to determine which web pages are substantially identical. After the index 38 is completely built, it is utilized to repair broken links by identifying substantially identical web pages that may be returned as alternatives to a web page associated with a broken link (step 46 in FIG. 3).

Figure 4:
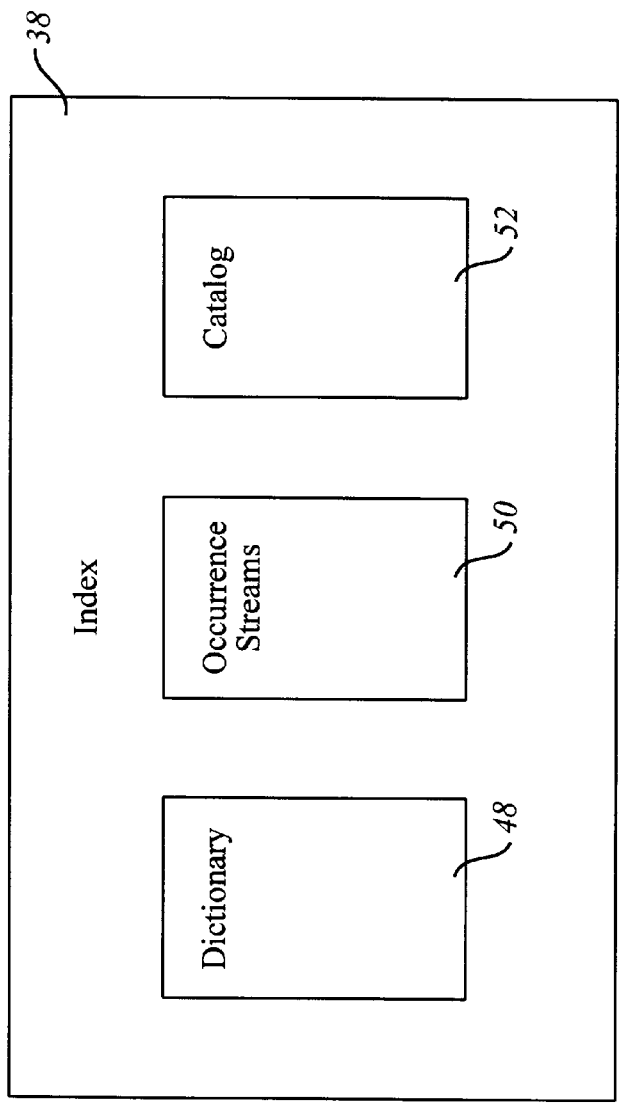
FIG. 4 is a block diagram that illustrates components of the index.
Figure 5:
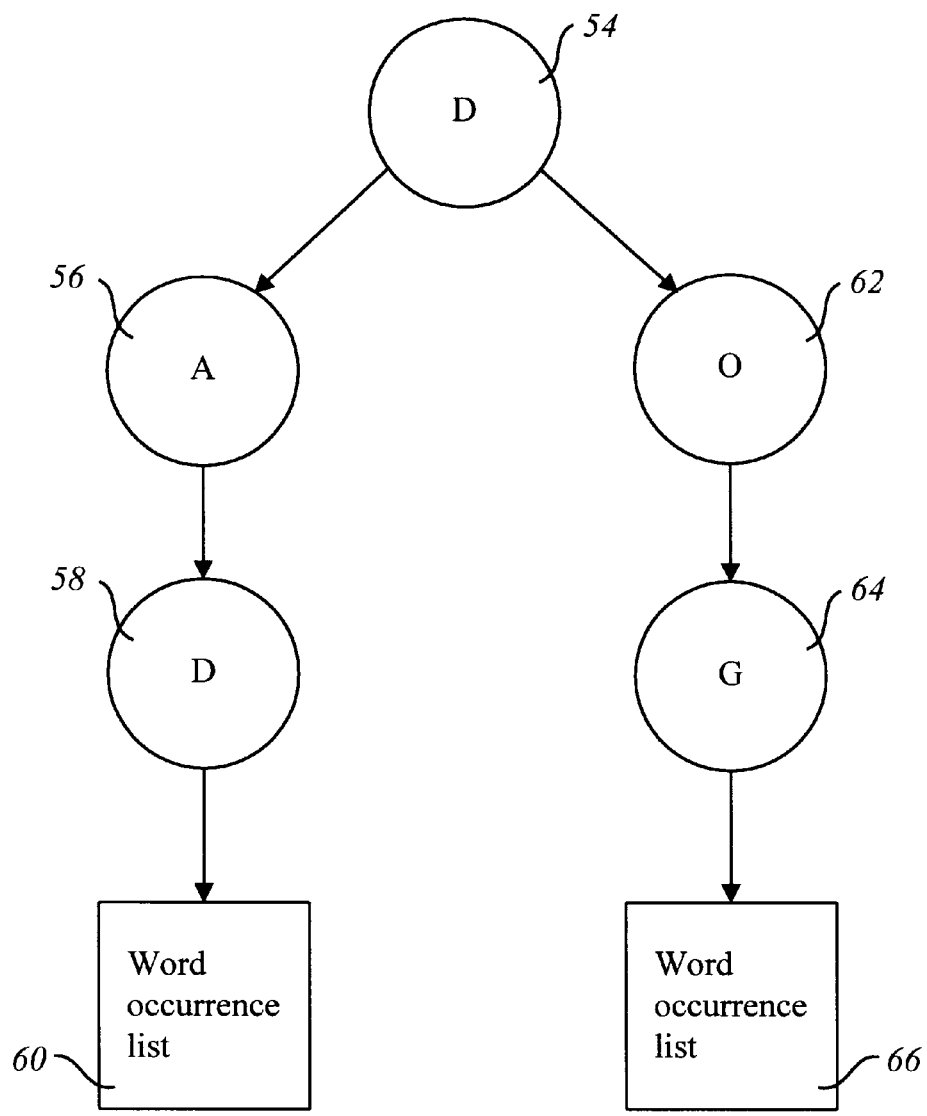
FIG. 5 is a diagram that depicts an example of a portion of the dictionary of FIG. 4.

In order to gain a better appreciation of the role of the index 38 it is helpful to review the major components of the index 38. As shown in FIG. 4, the index includes three primary components: a dictionary 48, an occurrence stream 50, and a catalog 52. The dictionary 48 employs an indexing scheme to efficiently lookup keys. In this context, the keys are the terms contained within the web page documents. FIG. 5 illustrates an example of a small portion of the dictionary 48. Those skilled in the art will appreciate that the dictionary may be organized in a different fashion and that the portion of the dictionary 48 shown in FIG. 5 is only a small part of the dictionary. Further, it should be appreciated that the dictionary need not include the terms depicted within FIG. 5. As shown in FIG. 5, the dictionary contains a number of nodes 54, 56, 58, 62 and 64. The nodes include pointers that interconnect the nodes. Each node is associated with a letter. The path formed by nodes 54, 56 and 58 is associated with the word "DAD," whereas the path from nodes 54, 62 and 64 is associated with the term "DOG." The leaf node 58 points to a world occurrence list 60 for the term "DAD." Similarly, the leaf node 64 points to a word occurrence list 66 for the term "DOG." As will be described in more detail below, each word occurrence list identifies which document the associated term appears in and where the term appears within the document. The dictionary is, thus, used as an indexing scheme to identify terms and gain access to their associated word occurrence list 60, and 66. The word occurrence list 60 and 66 are part of the occurrence streams 50 shown in FIG. 4.

Figure 6:
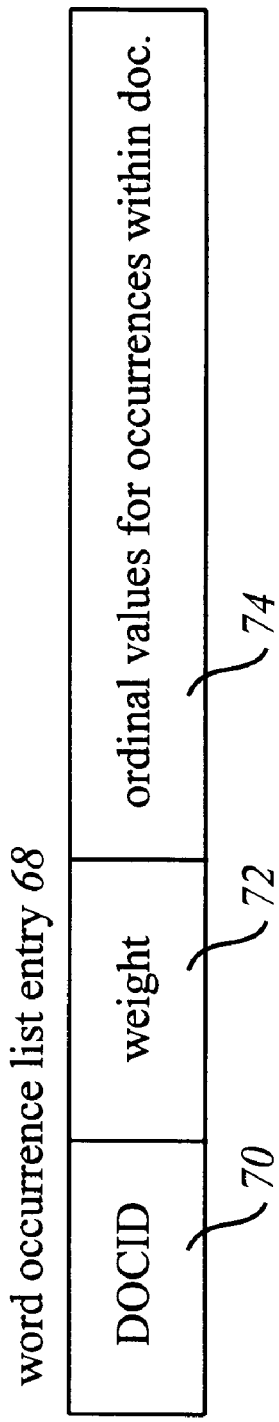
FIG. 6 is a diagram that illustrates the format of a word occurrence list entry that is part of a word occurrence list.

The occurrence streams 50 hold information about the occurrence of terms within documents in a compressed form. Specifically, the word occurrence information is stored as a stream that does not include redundant information. The word occurrence list may contain an entry for each associated document that contains the term. FIG. 6 depicts an entry 68 for a single document. The entry 68 includes a document identifier (DOCID) 70 and a weight 72 for the term. The weight calculation for a term will be described in more detail below. The word occurrence list entry 68 also includes a sequence 74 of ordinal values for occurrences of the term within the document. The ordinal values indicate a location of the term within the document. For example, an ordinal value of 56 indicates that the term appears as the fifty-sixth word within the document.

Figure 7:
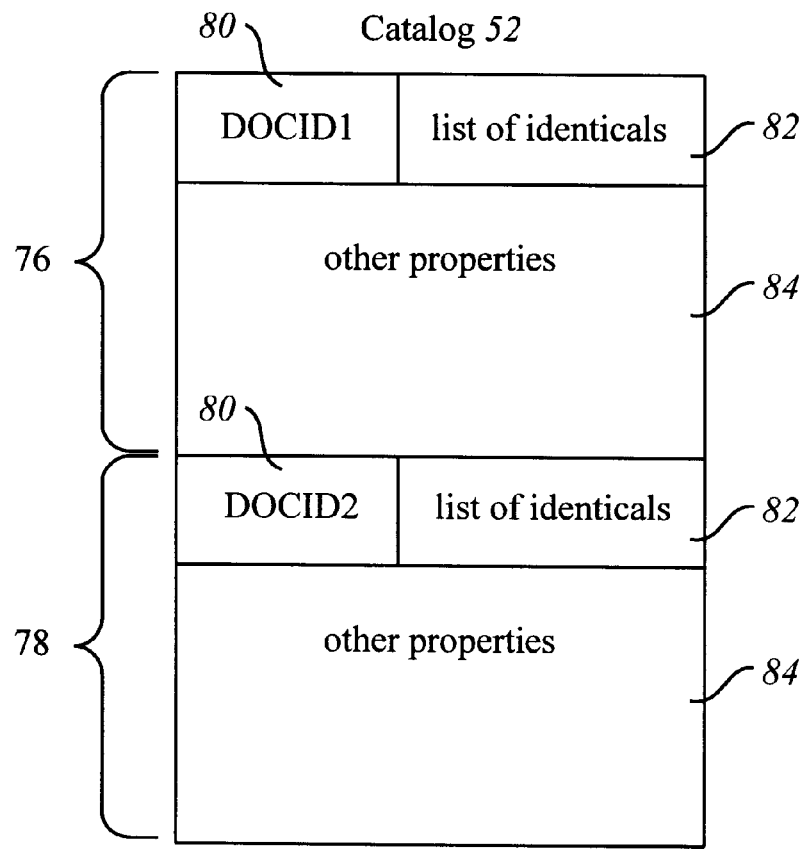
FIG. 7 depicts an example of entries within the catalog of FIG. 4.

Returning to FIG. 4, the catalog 52 serves as a property cache for holding property information regarding web page documents. FIG. 7 depicts the format of a portion of the catalog 52. Specifically, FIG. 7 depicts catalog entries 76 and 78 that are associated with two distinct documents. Each of the catalog entries 76 includes a DOCID 80, which serves as an indexing key into the catalog. Each catalog entry 76 and 78 also includes a list of identical web page documents 82. The document identifier for the identicals may be stored within the list 82. Other property information 84 is also stored within the catalog entries 76 and 78, including the uniform resource locator (URL) for the document.

As discussed above relative to step 42 of FIG. 3, the client computer system 24 builds the index 38 (shown in FIGS. 2 and 4). Those skilled in the art, however, will appreciate that the index could be located remotely relative to the client and remotely accessed by the client. Furthermore, the index could be pre-built by another entity and used by the client 24. Still further, the portion of the index that contains the list of identicals could be separated from the other portions of the index.

Figure 8:
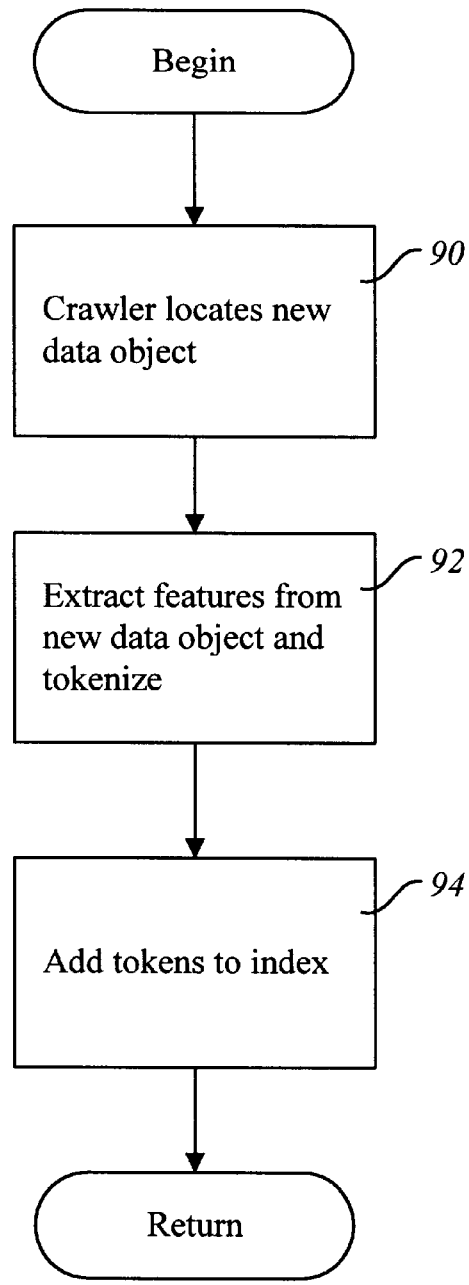
FIG. 8 is a flowchart illustrating the steps that are performed to build the index.

FIG. 8 depicts the steps that are performed to build the index. The exemplary embodiment of the present invention utilizes a web crawler that crawls web sites as a background process and locates changes in content on web sites that are indexed by the index 38. Such web crawlers are well known within the art. The web crawler enables the index 38 to be incrementally updated. The web crawler locates newly added data objects, such as web page documents (step 90 in FIG. 8). Features are then extracted from the new data object and tokenized (step 92). When the data object is a web page document, the features are terms within the text of the web page document. These terms are tokenized by using conventional natural language processing techniques. The tokens are then added to the index 38 (step 94 in FIG. 8). Specifically, the tokens are used to build the dictionary 48 and the occurrence streams 50 in accordance with conventional natural language processing techniques.

Figure 9:
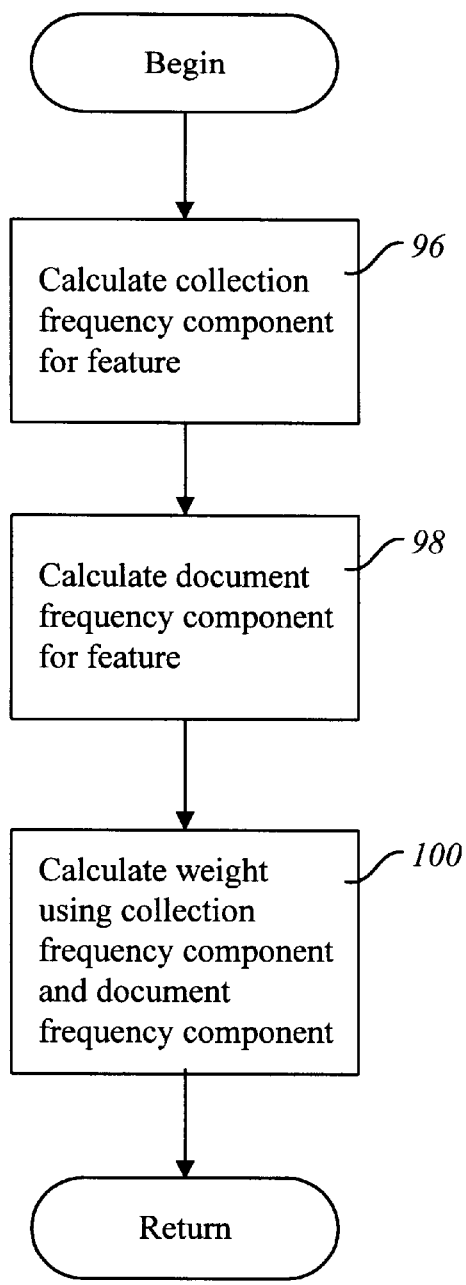
FIG. 9 is a flowchart illustrating the steps that are performed to calculate a word weight for a term.

As part of the creation of the occurrence streams 50, each term must be assigned a weight. FIG. 9 illustrates a flowchart of the steps that are performed to assign such weights. The steps of FIG. 9 are performed for each term that appears within a web page document. A collection frequency component is calculated for each word within the web page document (step 96 in FIG. 9). The collection frequency component indicates how frequently the term appears within the collection of documents being indexed. The collection frequency component may be calculated as the logarithm base 10 of (the number of documents in the collection) divided by (the number of documents in which the term occurs). The collection frequency component specifies how readily the term differentiates documents within the collection. In general, there is an inverse relationship between meaningfulness and the number of documents in which the term occurs.

The document frequency component is then calculated for the term (step 98 in FIG. 9). The document frequency component indicates the number of times that a term occurs within a document. This number may be normalized to correct for skewing due to the repetition of the term within the document.

Using the collection frequency component and the document frequency component, the client computer system 24 calculates a weight for the term (step 100 in FIG. 9). In general, the weight is calculated as the product of the collection frequency component with the document frequency component, divided by a normalization component. The normalization component may account for the number of terms within the document. A suitable normalization component is the square root of the sum of the squared weights of the other terms in the documents. Those skilled in the art will recognize this as the cosine normalization function and will recognize that other word weight and normalization functions may be used as well. Examples of suitable word weight functions include the binary term independence weight often calculated as log(N−n/n), where N is the number of documents in the collection and n is the collection frequency of the word, or a weighted probabilistic function such as 0.5+(0.5 tf)/max(tf), where max(tf) is the maximum term frequency found in the document. Examples of other normalization functions include simple document length calculated as length in bytes or terms, the square root of sums of squares of tf's in the document, the sum of term weights or the maximum term weight found in the document. The cosine normalization function will be preferred in many applications since the resulting number may be used both for word weight calculation and for the measurement of progress in reaching the "perfect score" for the document, as discussed below. For weighting functions in which the "perfect score" for the document is not a constant, the perfect score can be recorded in an element in the index, and the same thresholds apply, except the thresholds apply as percentages of the stored perfect weight.

In general, a normalization approach which expresses dependence on specific word values, such as those employing the sums of word weights, would work better than those approaches which are independent of specific word values, such as byte length. These approaches would work better because the resulting word weight is more likely to occur in those documents which have the same combination of terms. The other approaches work because the factors that they measure represent a telltale statistical signature that seldom occurs in non-identical documents.

Consider the following example document concerning orphans:

Orphan, a minor who has lost one or both parents. In ancient times the care of orphans was a private matter. The responsibility of the community for the care of orphans was recognized by the early Christians, and collections to raise funds were taken among the members of congregations. Later church charity provided for the establishment of orphan asylums as well as for the care of orphans in monasteries. The duty of the state to provide for orphans was first recognized in the early 17th century, in England, where they were often placed in institutions known as workhouses. The abuses of the workhouse system led in the 18th century to the establishment by the government of separate residential schools, called barrack schools, for the housing and instruction of orphans, and to a growing number of orphan asylums founded by private groups. Orphanages were favorite objects of philanthropy in the 19th century as concern mounted over the mistreatment of children. As the negative effects of institutional regimentation on children's personalities became better understood, however, the emphasis shifted to care in foster homes and to adoption opportunities.

In most countries, including Great Britain and the United States, orphans are recognized as wards of the state, and governmental provision is made for their care. In the U.S. both state and federal legislation provides for aid to orphans in various forms, including their total support in orphanages and foster homes, when necessary. Orphanages in the U.S. are also maintained by religious organizations, by social or fraternal organizations, and by private endowment.

In recent times orphanages have been organized on the so-called cottage system, in which children live together in small groups under the care of a house mother. In these groups efforts are made to integrate the lives of the children with the life of the community. All Jewish institutions and most Protestant institutions, for example, provide for the education of their charges in public schools in which they can meet and associate with other children. In addition, increasing emphasis is given to securing qualified supervisory personnel with medical, psychiatric, dietary, and social work training. Even so, in recent years, orphanages are being replaced by group homes, where care is provided for a limited number of children, and by individual care in foster homes. These programs are funded by government agencies and by religious and charitable organizations. See also Adoption.

Suppose this document is part of a collection of 25,000 documents and suppose that the term "orphans" occurs in only 44 of the 25,000 documents. This term occurs 10 times in the above example document. As a result, the normalized weight for this term is 0.66581. For another document to have precisely a weight of 0.66581 for the term "orphans," the other document would have to have exactly the same combination of word weights as the source document. The chance of such a common weight value are exceedingly rare.

Figure 10:
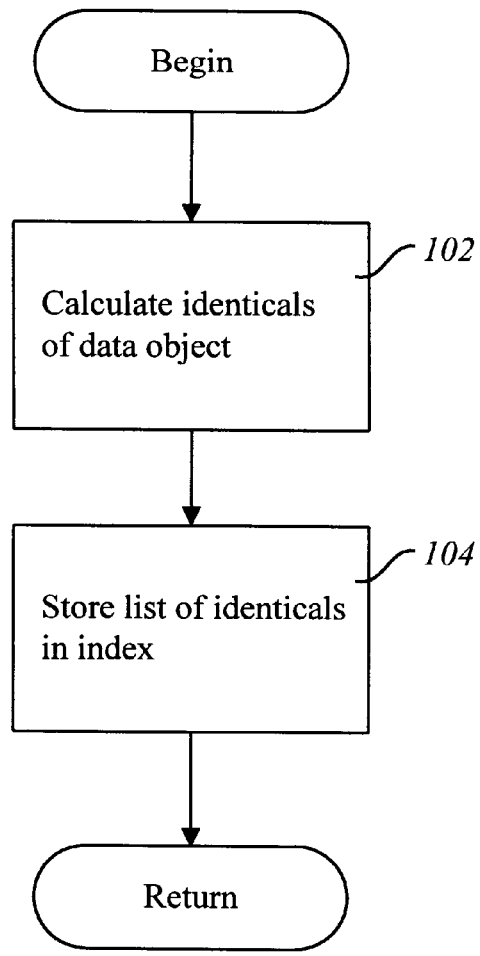
FIG. 10 is a flowchart illustrating the steps that are performed to generate a set of identical web pages for a given web page.
Figure 11:
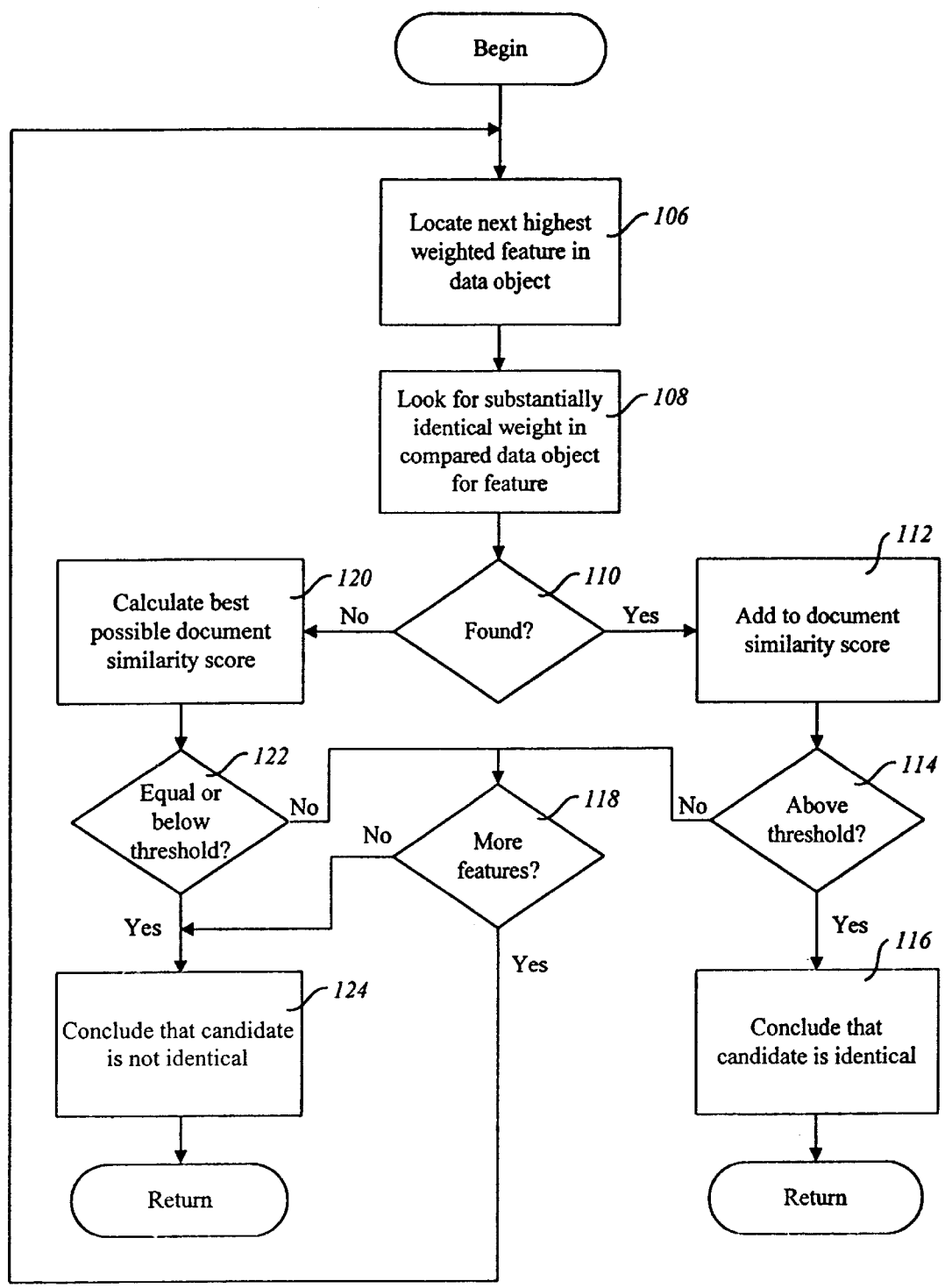
FIG. 11 is a flowchart illustrating the steps that are performed to determine whether data objects are substantially identical or not.

Given the weights for each of the terms within each of the documents, the exemplary embodiment of the present invention then calculate s which web page documents are identical. For a given web page document, the identicals are calculated step 102 in FIG. 10). The resulting list of identicals is then stored within the catalog 52 of the index 38 (step 104 in FIG. 10). FIG. 11 illustrates in more detail how identicals for a data object are calculated in step 102 of FIG. 10. It should be appreciated that word occurrence list entries are stored in a sorted order with the highest weighted terms at the front of the word occurrence list.

For a given web page document, the calculation of identicals begins by locating the highest weighted term within the document (step 106 in FIG. 11). The most likely high weight terms can be determined on the fly by referencing the dictionary portion of the index. The collection frequency counts n ay be stored at the leaves of the dictionary. These collection frequency counts indicate relative weights of the words. The collection frequency counts may be used in combination with the term frequency counts to identify the most highly weighted term in the document without having to probe in occurrence streams. Alternatively, the most highly weighted terms may be cached in the catalog. In one term weighting schemes (such as the weighted probabilistic function), the most important term can be determined without referencing the index. The occurrence streams 50 are examined to locate any other web page documents that contain the given term with the same or substantially the same weight (step 108 in FIG. 11). As was discussed above, the dictionary 48 may be used to access the word occurrence list (see FIG. 5) for a given term. The word occurrence list contains a list of which documents contain the term and the weight assigned to the term for those documents. These word occurrence lists are utilized in step 108. If such a document containing the highest weighted term and a substantially similar weight for the term is found (see step 110), each such document is considered a potential candidate for the set of identicals. Since a perfectly identical web page document would have all of the same weights for all of the terms within the web page document being analyzed and the total of the weights would be a normalized value of 1, it can be determined how great the highest weighted term contributes to the total weight when this contribution is added to a document similarity value that is initialized as 0. The document similarity value is initially calculated as the dot product of the weight for the term in the first web page document with the weight for this term in the second document. For example, if the term "orphans" was the highest weight term in the above example document and this was compared to a second web page document that contained the same weight of 0.66581, the document similarity score would be calculated as $0.66581^2$ or 0.4433 (see step 112 in FIG. 11).

The document similarity score is then compared to a threshold (step 114 in FIG. 11). A suitable threshold value is 0.8. If the document similarity score exceeds the threshold in step 114, it is concluded that the candidate is identical and should be added to the identicals list (step 116 in FIG. 11). On the other hand, if it is determined that the document similarity score is not above the threshold then more terms within the web page document being analyzed must be examined. If there are any more terms remaining (see step 118) the next highest weighted term is located (see step 106 in FIG. 11) and the process is repeated. If, however, there are no more features, since the document similarity score is below the threshold or equal to the threshold, it is concluded that the document candidate is not identical to the web page document that is being analyzed (step 124 in FIG. 11).

Suppose that the document's similarity score as calculated in step 112 of FIG. 11 is not above the threshold (see step 114 in FIG. 11) and that there are more terms within the document (see step 118 in FIG. 11). In such a case, the weight for the next highest scoring term in the web page document being analyzed is identified, and it is determined whether the candidate web page document includes a substantially similar weight for the term (see step 108 in FIG. 11). It is helpful to return to the example discussed above where the web page document being analyzed contained the term "orphans" as did the candidate web page document. Suppose that the next most significantly weighted term in the web page document being analyzed is "care." This term has a weight of 0.24861. Further, suppose that the candidate includes the weight for the term "care" that matches the score for the term within the web page document being analyzed. The square of the weight of the term "care" is then added to the document similarity score in step 112. If it is additionally assumed that the threshold is 0.5, the document similarity score would then be above the threshold and it would be concluded that the candidate document is identical in step 116 of FIG. 11.

The above discussion is focused on the instance where at least one identical weight for a term has been found within a candidate document. It is useful to also consider the case where the term or a similar weight is not found within the candidate document. In such a case, a best possible document similarity score is calculated for the candidate document (step 120 in FIG. 11). This value is calculated as one minus the contribution of the term to the document similarity score. If a candidate did not include the term "orphans" in the above example, the best possible document similarity score would be 1–0.4433 or 0.5566. This value is then compared to the threshold value in step 122 of FIG. 11. If it is supposed that the threshold value is 0.8, it is concluded that the candidate document is not identical to the web page document being analyzed. If, on the other hand, the value is not below the threshold as checked in step 122 of FIG. 11, and more terms remain in the document (see step 118 in FIG. 11), there is the possibility that the document is still substantially identical and the above-described steps are repeated.

It should be appreciated that multiple candidate documents may be processed concurrently. In the above discussion, it was assumed that only a single candidate document was being compared with the web page document being analyzed. In fact, it is likely more efficient to look at multiple documents concurrently. Thus, for example, each of the documents that contains the matching weight for "orphans" would be considered as a candidate and then weights for additional terms in these candidate documents would be scrutinized to determine whether or not the candidates are substantially identical to the web page document being analyzed.

Those skilled in the art will appreciate that different threshold values may be utilized depending on the degree of exactitude that is required for data objects to be considered substantially identical. In addition, the degree of match between scores in different documents may vary from requiring an exact same weight to requiring a weight within a certain range of error.

This approach enables the exemplary embodiment of the present invention to quickly discern which data objects within a fairly large set of data objects are potentially identical to a given data object. Moreover, this approach can then very quickly identify which data objects amongst the candidates are substantially identical without exhausting a large amount of computational effort.

Figure 12:
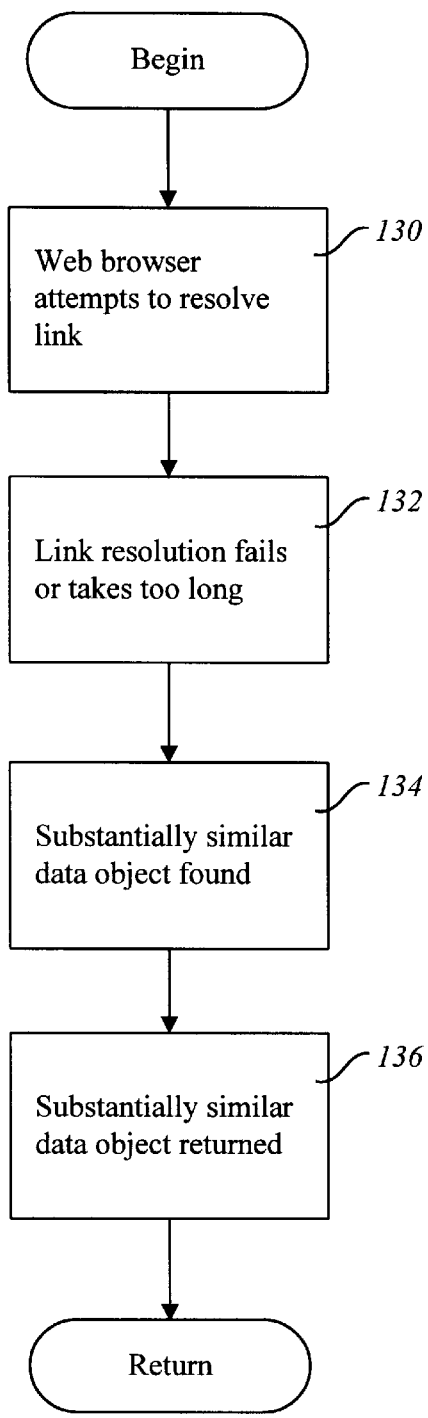
FIG. 12 is a flowchart illustrating the steps that are performed to repair a hyperlink in the exemplary embodiment of the present invention.

After the system has built the index and identified which data objects are identical, an instance may arise where a hypermedia link needs to be repaired (see step 46 in FIG. 3). In such an instance, the steps depicted in FIG. 12 are performed. The web browser 36 attempts to resolve a link within a hypermedia document. Suppose that the web browser 36 attempts to resolve a link that points to the media 40a on server 26 (see step 130 in FIG. 12). The link resolution then either fails or exceeds within a predetermined period of time. The web browser may employ a timer such that when a fixed time period elapses (see step 132), link repair is initiated. The web browser 36 then locates a substantially similar data object (see step 134) within the index 38. In particular, the web browser 36 uses the URL to look up the doc ID to locate the entry in the catalog 50 for the document. This entry includes the list of identicals (i.e., it contains the doc IDs for the identicals). One of the identicals is then used to repair the link. In particular, the catalog 52 is again consulted to determine a uniform resource locator (URL) for the substantially identical data object. The URL identifies the location of a substantially identical data object on the Internet and is stored in the other properties 84 for the catalog data entry of the substantially identical data object. The web browser then utilizes this URL to request that the substantially similar data object be returned (step 136 in FIG. 12). Hence, if the media 40a could not be returned from server 26 as a result of a broken link in a Hypertext document, the web browser 36 could locate the URL to return the media 40b from server 28 that is substantially identical to the media 40a.

Those skilled in the art will appreciate that the present invention may use a database engine, such as an SQL engine, to look up the list of identical documents rather than using the index.

A number of optimizations may be applied to the above-described approach. For example, where the word occurrence lists are quite long, jump-ahead pointers may be utilized at fixed locations within the list to expedite searching of the list. Moreover, once a set of identicals is identified for a first document, the set of identical documents need not be processed to locate further identicals, since presumably all of the identicals are already within the identified set. A further optimization is to perform calculation of identical documents only upon demand (i.e., after a broken link arrives).

While the present invention has been described with reference to a exemplary embodiment thereof, those skilled in the art will appreciate that various changes in form and detail may occur without departing from the intended scope of the present invention as defined in the appended claims. For example, the present invention may be applied to non-textual features, such as features of audio data and/or image data. In addition, the references to objects or files need not be URLs. The references may be path names, links (such as Microsoft® OLE links), network operating system resource identifiers or object identifiers. Still further, the present invention may be practiced in non-Internet and non-intranet environments and may be practiced by applications other than web browsers.

I claim:

1. In a computer system, a method comprising computer-implemented steps of:
    obtaining a first plurality of weights for a first plurality of features of a first data object and a second plurality of weights for a second plurality of features of a second data object, each of said weights being associated with a corresponding one of the features in the first or second pluralities of features, wherein said each weight quantitatively specifies an amount by which the corresponding one feature distinguishes an associated data object from other data objects contained within a collection of data objects;
    comparing a first weight for a selected one of the features of the first data object with a second weight for the selected one feature of the second data object so as to determine whether the first and second data objects are substantially identical; and
    if the first and second data objects are substantially identical, accessing the second data object, in response to a request emanating from a requesting party for the first data object, when the first data object cannot be accessed in a predefined manner by the requesting party.

2. The method of claim 1 further comprising the step of returning, in response to the request, the second data object to the requesting party.

3. The method of claim 1 further comprising the step of determining that the first and second data objects are not substantially identical when values of the first and second weights are not substantially similar to each other.

4. The method of claim 1 wherein the comparing step comprises the step of comparing additional corresponding ones of the weights in the first and second pluralities of weights for additional associated ones of the features of said first and second data objects, respectively.

5. The method of claim 4 wherein the first and second data objects are substantially identical only if values of the first and second weights equal each other.

6. The method of claim 4 wherein the comparing step comprises the step of determining that the first and second data objects are not substantially identical when values of the first and second weights are not substantially similar to each other.

7. The method of claim 1 wherein either one of the first and the second data objects is located on an Internet or intranet server.

8. The method of claim 1 further comprising the step of determining each of said weights.

9. The method of claim 1 wherein the computer system is a distributed system having an network operating system and wherein each of the first data and second objects is a resource, in the distributed system, accessible via the network operating system.

10. In a computer system having access to web pages, a method comprising computer-implemented steps of:
    obtaining a first plurality of weights for a first plurality of terms of a first web page and a second plurality of weights for a second plurality of terms of a second web page, each of said weights being associated with a corresponding one of the terms in the first or second pluralities of terms, wherein said each weight quantitatively specifies an amount by which the corresponding one term distinguishes an associated web page from other web pages contained within a collection of web pages;
    comparing a first weight for a selected one of the terms of the first web page with a second weight for the selected one term of the second web page so as to determine whether the first and second web pages are substantially identical; and
    if the first and second web pages are substantially identical, accessing the second web page, in response to a request emanating from a requesting party for the first web page, when the first web page cannot be accessed in a predefined manner by the requesting party.

11. The method of claim 10 wherein the request comprises a uniform resource locator (URL) for the first web page.

12. The method of claim 11 wherein the first web page cannot be accessed because the URL in the request is not valid for the first web page.

13. The method of claim 10 further comprising the step of returning, in response to the request, the second web page to the requesting party.

14. The method of claim 10 further comprising the step of determining that the first and second web pages are not substantially identical when values of the first and second weights are not substantially similar to each other.

15. The method of claim 10 wherein the comparing step comprises the step of comparing additional corresponding ones of the weights in the first and second pluralities of weights for additional associated ones of the terms of said first and second web pages, respectively.

16. The method of claim 10 wherein either the first or second web page is located on an Internet or intranet server.

17. The method of claim 10 wherein the method further comprises the step of determining each of the weights.

18. The method of claim 10 further comprising the step of storing the weights in the first and second pluralities in an index of web pages that indexes terms within web pages.

19. The method of claim 10 wherein the comparing step comprises the step of determining that the first and second web pages are not substantially identical when values of the first and second weights are not substantially similar to each other.

20. In a computer system, a method comprising the steps of:
 providing a hypertext document having a hyperlink to a first web page holding media content;
 in response to a party selecting the hyperlink, attempting to access the first web page so as to define an access attempt; and
 if the access attempt is unsuccessful, identifying a second web page, holding substantially identical media content to the media content in said first web page, through the steps of:
  obtaining a first plurality of weights for a first plurality of features of the media content in the first web page and a second plurality of weights for a second plurality of features of the media content in the second web page, each of said weights being associated with a corresponding feature, in the first or second pluralities of features, of the media content in either the first or second web pages, wherein said each weight quantitatively specifies an amount by which the corresponding one feature distinguishes the associated media content in either the first or second web pages from media content contained within a collection of other web pages; and
  comparing a first weight for a selected one of the features of the media content in the first web page with a second weight for the selected one feature of the media content in the second web page so as to determine whether the media content in the first and second web pages is substantially identical; and
 where the access attempt is unsuccessful and the media content in the first and second web pages is substantially identical:
  accessing the media content in the second web page; and
  returning the media content in the second web page to the party which selected the hyperlink to the first web page.

21. The method of claim 20 wherein the media content in the first web page comprises text.

22. The method of claim 20 wherein the hyperlink comprises information specifying a network location of the first web site and wherein the access attempt is not successful because the information is incorrect.

23. The method of claim 20 wherein the access attempt is not successful because a predetermined time interval has elapsed since the request was initiated but before the first web site could be accessed.

24. The method of claim 20 wherein the identifying, accessing and returning steps all occur substantially transparently to the party.

25. In a computer system, a method comprising the computer-implemented steps of:
 calculating first and second word weights for a selected term within a first document and for the selected term within a second document, respectively, by:
  (i) calculating a collection frequency component that identifies how often the selected term appears within documents in a collection of documents;
  (ii) calculating first and second term frequency components for the first and second documents equal to a number of times that the selected term appears within the first and second documents, respectively; and
  (iii) calculating first and second products of the collection frequency component and the first and second term frequency components, respectively, and normalizing the first and second products to respectively produces the first and second word weights;
 comparing the first word weight with the second word weight so as to determine whether the first and second documents are substantially identical; and
 if the first and second documents are substantially identical, accessing the second document, in response to a request emanating from a requesting party to access the first document, when the first document can not be accessed in a predefined manner by the requesting party.

26. The method of claim 25 wherein the first and second documents are first and second web pages, respectively.

27. The method of claim 25 further comprising the step of returning, in response to the request, the second document to the requesting party.

28. For use with a computer system, a computer-readable medium storing computer-executable instructions for performing a method comprising the computer-implemented steps of:
 obtaining a first plurality of weights for a first plurality of features of a first data object and a second plurality of weights for a second plurality of features of a second data object, each of said weights being associated with a corresponding one of the features in the first and second pluralities of features, wherein said each weight quantitatively specifies an amount by which the corresponding one feature distinguishes an associated data object from other data objects contained within a collection of data objects;
 comparing a first weight for a selected one of the features of the first data object with a second weight for the selected one feature of the second data object so as to determine whether the first and second data objects are substantially identical; and
 if the first and second data objects are substantially identical, accessing the second data object, in response to a request emanating from a requesting party for the first data object, when the first data object cannot be accessed in a predefined manner by the requesting party.

29. The computer-readable medium of claim 28 wherein the computer executable instructions further comprise instructions for performing the step of returning, in response to the request, the second data object to the requesting party.

30. The computer-readable medium of claim 28 wherein the computer executable instructions further comprise instructions for performing, in the comparing step, the step of comparing additional corresponding ones of the weights in the first and second pluralities of weights for additional associated ones of the features of said first and second data objects, respectively.

31. The computer-readable medium of claim 28 wherein the first and second data objects are substantially identical only if values of the first and second weights equal each other.

32. The computer-readable medium of claim 28 wherein the computer executable instructions further comprise instructions for performing the step of determining each of said weights.

33. The computer-readable medium of claim 28 wherein the computer executable instructions further comprise instructions for performing the step of determining that the first and second data objects are not substantially identical when values of the first and second weights are not substantially similar to each other.

34. For use with a computer system having access to web pages, a computer-readable medium storing computer-executable instructions for performing a method comprising the computer-implemented steps of:
  obtaining a first plurality of weights for a first plurality of terms of a first web page and a second plurality of weights for a second plurality of terms of a second web page, each of said weights being associated with a corresponding one of the terms in the first or second pluralities of terms, wherein said each weight quantitatively specifies an amount by which the corresponding one term distinguishes an associated web page from other web pages contained within a collection of web pages;
  comparing a first weight for a selected one of the terms of the first web page with a second weight for the selected one term of the second web page so as to determine whether the first and second web pages are substantially identical; and
  if the first and second web pages are substantially identical, accessing the second web page, in response to a request emanating from a requesting party for the first web page, when the first web page cannot be accessed in a predefined manner by the requesting party.

35. The computer-readable medium of claim 34 wherein the request comprises a uniform resource locator (URL) for the first web page.

36. The computer-readable medium of claim 35 wherein the first web page cannot be accessed because the URL in the request is not valid for the first web page.

37. The computer-readable medium of claim 34 wherein the computer executable instructions further comprise instructions for performing the step of returning, in response to the request, the second web page to the requesting party.

38. The computer-readable medium of claim 34 wherein the computer executable instructions further comprise instructions for performing the step of comparing additional corresponding ones of the weights in the first arid second pluralities of weights for additional associated ones of the terms of said first and second web pages, respectively.

39. The computer-readable medium of claim 34 wherein the computer executable instructions further comprise instructions for performing the step of determining each of the weights.

40. The computer-readable medium of claim 34 wherein the computer executable instructions further comprise instructions for performing the step of storing the weights in the first and second pluralities in an index of web pages that indexes terms within web pages.

41. The computer-readable medium of claim 34 wherein the computer executable instructions further comprise instructions for performing the step of determining that the first and second web pages are not substantially identical when values of the first and second weights are not substantially similar to each other.

42. For use with a computer system, a computer-readable medium storing computer-executable instructions for performing a method comprising the computer-implemented steps of:
  providing a hypertext document having a hyperlink to a first web page holding media content;
  in response to a party selecting the hyperlink, attempting to access the first web page so as to define an access attempt; and
  if the access attempt is unsuccessful, identifying a second web page, holding substantially identical media content to the media content in said first web page, through the steps of:
    obtaining a first plurality of weights for a first plurality of features of the media content in the first web page and a second plurality of weights for a second plurality of features of the media content in the second web page, each of said weights being associated with a corresponding feature, in the first or second pluralities of features, of the media content in either the first or second web pages, wherein said each weight quantitatively specifies an amount by which the corresponding one feature distinguishes the associated media content in either the first or second web page from media content contained within a collection of other web pages; and
    comparing a first weight for a selected one of the features of the media content in the first web page with a second weight for the selected one feature of the media content in the second web page so as to determine whether the media content in the first and second web pages is substantially identical; and
  where the access attempt is unsuccessful and the media content in the first and second web pages is substantially identical:
    accessing the media content in the second web page; and
    returning the media content in the second web page to the party which selected the hyperlink to the first web page.

43. The computer-readable medium of claim 42 wherein the hyperlink comprises information specifying a network location of the first web site and wherein the access attempt is not successful because the information is incorrect.

44. The computer-readable medium of claim 42 wherein the access attempt is not successful because a predetermined time interval has elapsed since the request was initiated but before the first web site could be accessed.

45. For use with a computer system, a computer-readable medium storing computer-executable instructions for performing a method comprising the computer-implemented steps of:
  calculating first and second word weights for a selected term within a first document and for the selected term within a second document, respectively, by:
    (i) calculating a collection frequency component that identifies how often the selected term appears within documents in a collection of documents;
    (ii) calculating first and second term frequency components for the first and second documents equal to a number of times that the selected term appears within the first and second documents, respectively; and (iii) calculating first and second products of the collection frequency component and the first and second term frequency components, respectively, and normalizing the first and second products to respectively produce the first and second word weights;

comparing the first word weight with the second word weight so as to determine whether the first and second documents are substantially identical; and if the first and second documents are substantially identical, accessing the second document, in response to a request emanating from a requesting party to access the first document, when the first document can not be accessed in a predefined manner by the requesting party.

46. The computer-readable medium of claim 45 wherein the first and second documents are first and second web pages, respectively.

47. The computer-readable medium of claim 45 wherein the computer executable instructions further comprise instructions for performing the step of returning, in response to the request, the second document to the requesting party.

* * * * *

UNITED STATES PATENT AND TRADEMARK OFFICE
CERTIFICATE OF CORRECTION

PATENT NO : 5,941,944
DATED : August 24, 1999
INVENTOR(S): John J. Messerly

It is certified that error appears in the above-identified patent and that said Letters Patent is hereby corrected as shown below:

Column 6, line 9     Replace "world" with --word--;

Column 8, line 61    Replace "calculate s" with --calculates--;
         line 63    Replace "step 102" with --(step 102--;

Column 9, line 8     Replace "n ay" with --may--;

Column 14, line 23   Replace "produces" with --produce--; and

Column 15, line 57   Replace "arid" with --and--.

Signed and Sealed this

Fourth Day of April, 2000

Q. TODD DICKINSON

*Attest:*

*Attesting Officer*            *Director of Patents and Trademarks*